Patented Mar. 10, 1953

UNITED STATES PATENT OFFICE 2,631,169

METHOD FOR PREPARING SUBSTITUTED HYDROXY BENZYL ALCOHOL

Max E. Chiddix, Easton, and Marjorie R. Williams, Pen Argyl, Pa., assignors to General Aniline & Film Corporation, New York, N. Y., a corporation of Delaware No Drawing. Application September 12, 1950, Serial No. 184,522

8 Claims. (Cl. 260—622)

The invention relates to a process for the preparation of certain substituted hydroxy benzyl alcohols.

More particularly the invention relates to a new process for the preparation of compounds having the following general formula:

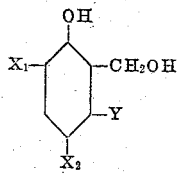

wherein $X_1$ and $X_2$ are selected from the group consisting of chlorine, bromine, and nitro groups and Y is selected from the group consisting of chlorine and bromine groups.

Certain reactions of phenol and formaldehyde are known. However, it has not been known to produce benzyl alcohols by reaction with the less reactive type substituted phenols of the present application.

According to the present invention substituted hydroxyl benzyl alcohols of the above general formula are prepared by reacting the corresponding substituted phenol at an elevated temperature with formaldehyde in the presence of alkali, e. g. alkali metal hydroxides. Preferably an excess of formaldehyde is used and the phenol dropped into it. One mol or more alkali is preferably used per mol of phenol and the temperature is in the range of 40° to 50° C. for a time in the range of 10 to 15 hours, and then the temperature is brought to and maintained in the range of 60° to 95° C. for at least one hour.

The following examples are illustrative of embodiments of the invention but substitutions and alterations may be made within the scope of the claims.

Example 1

In a flask equipped with stirrer and thermometer was placed 102.6 parts 35% aqueous formaldehyde which was then heated to 45° C.

A solution of 79.0 parts 2,4,5-trichlorophenol and 16.0 parts sodium hydroxide pellets in 100 parts water was added gradually to the stirred formaldehyde at 45-50° C. This addition required ten minutes. The reaction mixture was stirred at 45-50° C. for fourteen hours, then heated to 60° C. in one hour and held at 60-65° C. for two hours. The mixture was neutralized by passing in carbon dioxide gas, and an orange solid precipitated out. This solid was collected by filtration, washed well with water and dried in a vacuum desiccator. The crude dry product weighed 35.7 parts (39.2% of the theoretical yield) and had a melting-point of 90-96° C. This crude material was stirred with 100 parts of hot high boiling petroleum ether, filtered hot, and washed with an additional 100 parts of petroleum ether. This extraction was performed to remove any unreacted trichlorophenol which may have been present.

The insoluble residue weighed 35 parts and had a melting-point of 90-6° C. This product was recrystallized from 75 parts benzene, washed with low boiling petroleum ether, and dried. A crystalline product weighing 22 parts and having a melting point of 121.5-123° C. was obtained. A small sample was dissolved twice in boiling benzene, treated with Norite and filtered hot. Two subsequent recrystallizations from benzene yielded a white product which was dried at 95-100° C. for six hours. This solid had a melting point of 123-4° C.

The compound was 2-hydroxy-3,5,6-trichloro benzyl alcohol.

Analysis: Calculated for $C_7H_5O_2Cl_3$ (227.5): C, 36.96; H, 2.21, Cl, 46.76. Found: C, 36.81; H, 2.27; Cl, 46.93.

Dilution of the mother liquor with water produced a dark red oil which solidified on standing. The solid was filtered off and washed with water. The dry material weighed 20 parts (22% of the theoretical yield) and had a melting point of 92-109° C. One recrystallization from benzene yielded an orange solid which melted at 109-114° C.

Example 2

(Notebook No. 2632-150)

In a flask equipped with stirrer and thermometer was placed 653 parts of 35% aqueous formaldehyde which was then heated to 40° C. A solution of 500 parts of steam distilled 2,4,5-trichlorophenol, m. p. 59-63° C., and 102 parts of sodium hydroxide pellets in 1270 parts water was added gradually to the stirred formaldehyde at 40-50° C. This addition required fifty-five minutes. The reaction mixture was stirred at 45-50° C. for fifteen hours, heated to 88° C. in one hour and ten minutes, and held at 87-91° C. for one hour. The reaction mixture was placed in an ice bath and cooled to 38° in fifteen minutes. The orange solid obtained by neutralization was filtered, washed with water, and air-dried. There was obtained 393 parts (67.7% yield) of solid melting at 106-110° C.

Example 3

Using the same amounts as Example 2 the procedure of Example 1 was followed except that the reaction mixture was stirred at 45-50° C. for 10 hours, 50-60° C. for 1½ hours, and 60-65° C. for 2 hours. A semi-solid mass was formed upon neutralization; this material was extracted with ether and treated as in Example 2. There was obtained 38.4 parts of crude product. After treatment with petroleum ether, 22 parts (48.4% of the theoretical amount) of product was obtained with a melting point of 109–112° C. Three recrystallizations raised the melting point to 123–4° C.

Analysis Calc'd. for $C_7H_5O_2Cl_3$ (227.5): Cl, 46.76%. Found: Cl, 45.90; 45.67

*Example 4*

The procedure of Example 1 was repeated using 391 parts of purified 2,4,5-trichlorophenol, M. P. 64–66° C., 510 parts of 35% aqueous formaldehyde, 79 parts sodium hydroxide and 495 parts of water. The reaction mixture was stirred 13 hrs. at 45–50 and 3¾ hr. at 65–70° C. There was obtained 215 parts (47.7% yield) of solid melting at 105–113° C. No extraction with petroleum ether was necessary. After one recrystallization from benzene, 125 parts of product melting at 116–118° C. was obtained.

It had the following analysis:

Calc'd. for $C_7H_5O_2Cl_3$ (227.5): Cl, 46.76%. Found: Cl, 46.57

In a similar manner, 2,4,5-tribromophenol, 2,4-dinitro-5-bromophenol and 2,5-dinitro-5-chlorophenol may be reacted as in Example 1 above to give the corresponding substituted benzyl alcohol.

These compounds are useful as intermediates for the preparation of germicides and may themselves be germicides. The 2-hydroxy-3,5,6-trichloro benzyl alcohol is of particular importance for this purpose when reacted with other substituted phenols.

What we claim is:

1. A process for preparing a compound of the general formula,

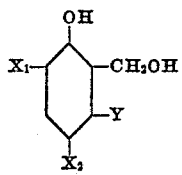

wherein $X_1$ and $X_2$ are selected from the group consisting of chlorine, bromine, and nitro groups and Y is selected from the group consisting of chlorine and bromine groups, which comprises reacting the corresponding substituted phenol with an excess of formaldehyde in the presence of aqueous alkali metal hydroxide catalyst at a temperature in the range of 40° to 50° C. for a time in the range of 10 to 15 hours, and then at a temperature in the range of 60° to 95° C. for at least one hour.

2. A process of claim 1 wherein the alkali is sodium hydroxide.

3. A process of claim 2 wherein the phenol reactant is slowly added to the formaldehyde.

4. A process of claim 3 wherein about one mol of the sodium hydroxide is used per mol of the phenol reactant.

5. A process of claim 4 applied to the preparation of 2-hydroxy-3,5,6-trichloro benzyl alcohol.

6. A process of claim 4 applied to the preparation of 2-hydroxy-3,5,6-tribromo benzyl alcohol.

7. A process of claim 4 applied to the preparation of 2-hydroxy-3,5-dinitro-6-chloro benzyl alcohol.

8. A process of claim 4 applied to the preparation of 2-hydroxy-3,5-dinitro-6-bromo benzyl alcohol.

MAX E. CHIDDIX.
MARJORIE R. WILLIAMS.

REFERENCES CITED

The following references are of record in the file of this patent:

FOREIGN PATENTS

| Number | Country | Date |
|--------|---------|------|
| 85,588 | Germany | Feb. 13, 1896 |
| 510,447 | Germany | Oct. 18, 1930 |

OTHER REFERENCES

Granger, Ind. Eng. Chem., vol. 24, No. 4, pp. 442–8 (April 1932), 7 pages.